United States Patent
Woodmansee et al.

[11] Patent Number: 5,847,357
[45] Date of Patent: Dec. 8, 1998

[54] LASER-ASSISTED MATERIAL SPRAY PROCESSING

[75] Inventors: Donald Ernest Woodmansee; Xiangli Chen, both of Niskayuna, N.Y.

[73] Assignee: General Electric Company, Schenectady, N.Y.

[21] Appl. No.: 917,237

[22] Filed: Aug. 25, 1997

[51] Int. Cl.$^6$ .............................. B23K 26/00; C23C 4/00
[52] U.S. Cl. ................................ 219/121.65; 219/121.47; 219/121.66; 427/446; 427/453
[58] Field of Search ......................... 219/121.65, 121.66, 219/121.47; 427/446, 450, 451, 452, 453, 454, 455, 456, 554, 556, 596, 597

[56] References Cited

U.S. PATENT DOCUMENTS

| | | | |
|---|---|---|---|
| 3,347,698 | 10/1967 | Ingham, Jr. | 427/446 |
| 3,717,914 | 2/1973 | Baird et al. | 427/455 |
| 3,848,104 | 11/1974 | Locke | 219/121.65 |
| 4,683,148 | 7/1987 | Rairden, III . | |
| 4,836,447 | 6/1989 | Browning | 219/121.47 |
| 5,019,686 | 5/1991 | Marantz . | |
| 5,047,612 | 9/1991 | Savkar et al. . | |
| 5,169,689 | 12/1992 | Thompson et al. . | |
| 5,268,045 | 12/1993 | Clare . | |
| 5,320,882 | 6/1994 | Chen . | |
| 5,321,228 | 6/1994 | Krause et al. | 219/121.84 |
| 5,357,075 | 10/1994 | Muehlberger . | |
| 5,539,176 | 7/1996 | Ikegaya et al. | 219/121.47 |
| 5,576,069 | 11/1996 | Chen et al. | 427/554 |
| 5,607,730 | 3/1997 | Ranalli . | |
| 5,609,922 | 3/1997 | McDonald | 427/455 |

FOREIGN PATENT DOCUMENTS

| | | | |
|---|---|---|---|
| 484115 | 10/1991 | European Pat. Off. . | |
| 61-217578 | 9/1986 | Japan | 427/452 |
| 62-192572 | 8/1987 | Japan | 427/453 |
| 63-69959 | 3/1988 | Japan | 427/446 |
| 3-107447 | 5/1991 | Japan . | |
| 5-271900 | 10/1993 | Japan | 427/453 |
| 63-72880 | 4/1998 | Japan | 427/597 |

OTHER PUBLICATIONS

Gjonnes & Olsen, Journal of Materials Science, "Laser–Modified Aluminum Surfaces With Iron", 29, (1994), pp. 738–735.

Kramarsic & Muehlberger, Proceedings of the International Thermal Spray Conference & Exposition, Orlando, FL, May 28–Jun. 5, 1992, "Methods of Improve Melting of Large Particles in a Plasma Stream", pp. 63–68.

Brandl et al., Eurojoin 1, 1991, Institute of Materials Technology, Dortmund, Germany, Laser Beam Remelting of Thermally Sprayed Titanium Coatings, pp. 271–278.

*Primary Examiner*—Geoffrey S. Evans
*Attorney, Agent, or Firm*—Patrick K. Patnode; Marvin Snyder

[57] ABSTRACT

A laser assisted thermal spray process for material spraying of a workpiece utilizes a primary energy source for producing a heating plume and a spray material injector for injecting a spray material comprising a plurality of particles into the heating plume. A deposit of the spray material transported by the heating plume is formed on the workpiece surface. The laser assisted thermal spray a process further utilizes a laser-heating system for irradiating a portion of the spray material and a portion of the targeted workpiece so as to limit incompletely melted particles thereon.

27 Claims, 2 Drawing Sheets

LASER-ASSISTED MATERIAL SPRAY PROCESSING

BACKGROUND OF THE INVENTION

This application relates generally to thermal spray processing, and more specifically relates to laser assisted thermal spray processing.

Thermal spray coatings are currently utilized in numerous industries to apply protective coatings, such as metallic, non-metallic (i.e., ceramic or diamond) or mixed metallic-non-metallic coatings to a targeted workpiece. Common to most thermal spray processes is that each process typically requires a heat source, a propelling means and a source of feed material. In most processes, the selected feed material is introduced in a very fine particulate state, is converted to a molten state and is propelled at a very high velocity upon the targeted workpiece.

Current thermal spray processes include flame spray, plasma-arc spray, electric-arc spray, high velocity oxygen fuel spray processes and the like.

Multiple parameters dictate the composition and microstructure of the sprayed coating or article. Accordingly, various techniques and methods have been developed to control process parameters so as to produce a predictable application of spray materials. One current problem with thermal spray processes is that a portion of the propelled spray material may not be completely melted upon the targeted workpiece. This is especially true for spray processes in which the propelled spray material has a trajectory that partially falls outside the hottest heated region of the process. Thus, a portion of the propelled spray material is likely to be deposited with insufficient heating.

This insufficient heating of the spray material may result in incomplete melting of the impinging spray material such that the spray material does not fuse to the workpiece surface, thereby forming inclusions upon the workpiece surface. Such inclusions add excess porosity to a coating deposit, potentially resulting in critical flaws within stressed parts.

Therefore, it is apparent from the above that there currently exists a need in the art for improvements in thermal spray processing, especially in the predicable application of fully melted spray materials.

SUMMARY OF THE INVENTION

At laser assisted thermal spray process for material spraying of a workpiece utilizes a primary energy source for producing a heating plume and a spray material injector for injecting a spray material comprising a plurality of particles into the heating plume. A deposit of the spray material transported by the heating plume is formed on the workpiece surface. The laser assisted thermal spray process further utilizes a laser-heating system for irradiating the spray material within an overspray region of the workpiece so as to promote the reheating of the spray material within the overspray region and to limit incompletely-melted particles thereon.

DETAILED DESCRIPTION OF THE INVENTION

Figure 1:
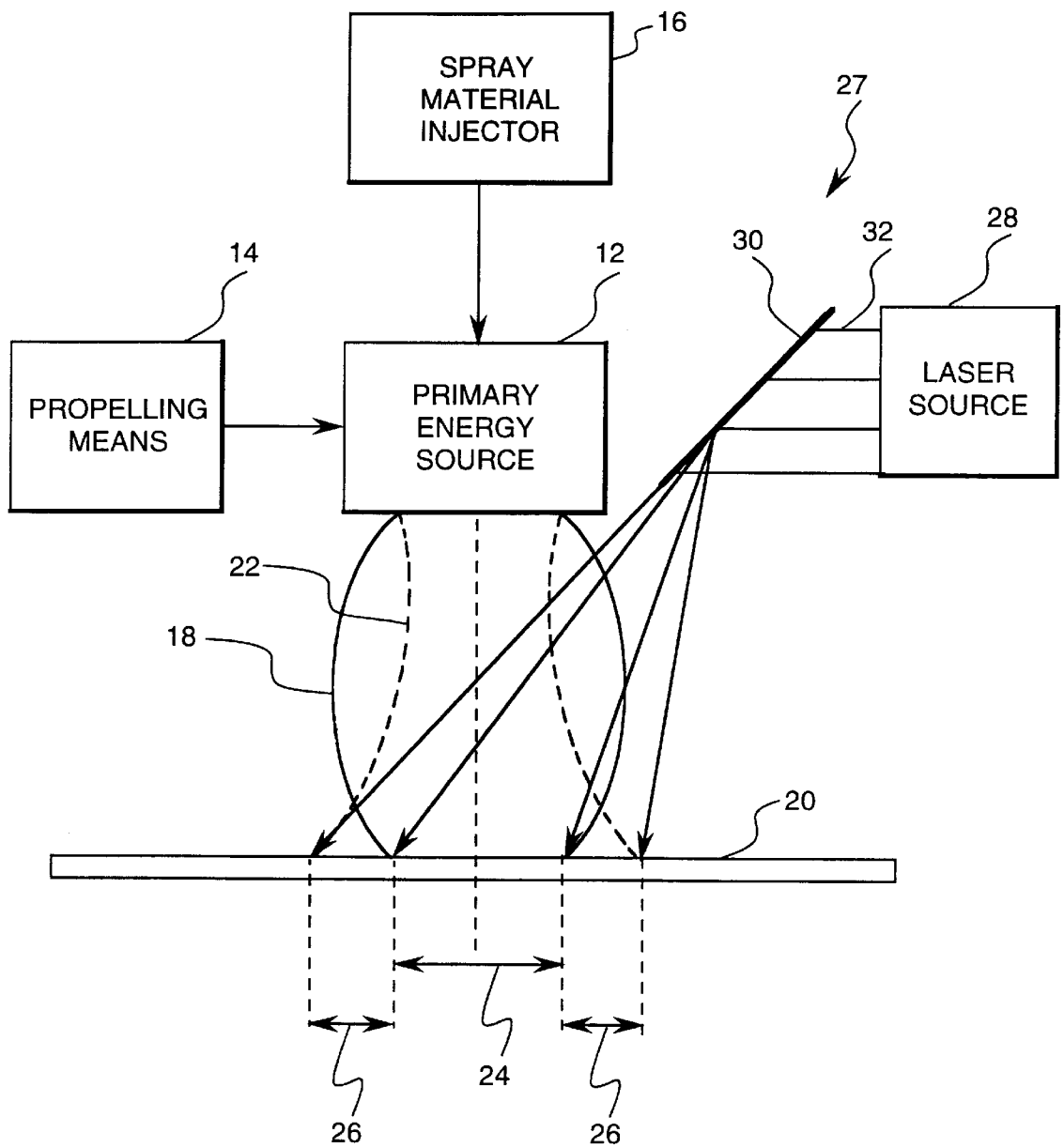
FIG. 1 is a schematic representation of a laser assisted material spray apparatus in accordance with the instant invention.

A laser assisted thermal spray system 10 generally includes a primary energy source 12, a propelling means 14 and a spray material injector 16.

Spray material injector 16 injects a spray material comprising a plurality of particulate into primary energy source 12. The spray material injected into primary energy source 12 may be of any type known to be suitable for use in thermal spray deposition processes including but not limited to metallic materials, non-metallic materials, for example ceramics or diamond, non-metallic-metallic mixed materials, ceramic-ceramic composite materials, ceramic-metal composite materials or metal-matrix composite materials.

Primary energy source 12 includes but is not limited to DC electric arcs, radio frequency electric arcs, and very high temperature combustion flames employing fuels such as hydrogen, methane, ethylene, acetylene, etc., and oxidizers such as air and oxygen. In systems where the metal starts as an ingot, primary energy source 12 further includes induction heating to provide a melt liquid pool that a stream is drawn from, so as to be subsequently broken up mechanically with an atomizing gas. In some systems, a large fraction of the primary energy is directed at the target surface which gives up heat to the transferred material upon impact.

Propelling means 14 typically introduces a flow of fuel gas within primary energy source 12 so as to establish a heating plume 18. The sweep of the fuel gas through primary energy source 12 propels the spray material toward a targeted workpiece 20. Targeted workpiece 20 may comprise, by way of example and not limitation, a metal substrate, a mandrel, or a mold cavity. Further, targeted workpiece 20 may be, for example, rotating, translated along x, y or z axes or stationary. The flow of coating material is provided by a combination of both feeding (and metering) and propelling means 14. If the material is a melt, the metering means is commonly the orifice diameter and the liquid depth.

Heating plume 18 is generated at a very high temperature, typically in the range of about 2000° C. and above. The energy of heating plume 18 is sufficient to cause melting to the majority of spray material particles introduced within heating plume 18. The majority of spray material particles are carried within heating plume 18 from primary energy source 12 to targeted workpiece 20 in a molten particle envelope 22.

The molten spray material impinges upon and adheres to targeted workpiece 20 forming a deposit of material thereon.

As discussed above, a problem exists in the prior art, in that a portion of the propelled spray material particles within molten particle envelope 22 may be incompletely melted. This is especially true for thermal spray processes in which the trajectory of propelled spray material within molten particle envelope 22 spreads beyond the outer extent of heating plume 18. The portion of molten particle envelope 22 spreading beyond the outer extent of heating plume 18 may result in spray material being deposited with insufficient heating. This insufficient heating of the spray material may result in incomplete melting of the spray materials and inclusions upon targeted workpiece 20.

For purposes of clarity, targeted workpiece 20 will be discussed in terms of two distinct regions, a core region 24 and an overspray region 26.

Core region 24 is herein defined as the region of targeted workpiece 20 in which the impinging spray material propelled within molten particle envelope 22 is completely contained within the extent of heating plume 18. Core region 24 typically comprises a region essentially circular in cross-section. As used herein, the phrase "essentially circular" is defined as the property or attribute of being basically circular for purposes of classification or identification. The impinging spray upon core region 24 is classified as substantially fully melted. As used herein, the phrase "substantially fully melted" is defined as the state of the spray material in which the material contains less than about 1 percent by volume of incompletely melted particles.

Overspray region 26 is herein defined as the region of targeted workpiece 20 in which the impinging spray material propelled within molten particle envelope 22 spreads beyond the outer extent of heating plume 18. Overspray region 26 typically comprises a region essentially annular in cross-section. As used herein, the phrase "essentially annular" is defined as the property of attribute of being basically annular for purposes of classification or identification. The impinging spray upon overspray region 26 typically contains incompletely melted particles.

In accordance with one embodiment of the instant invention, laser assisted thermal spray system 10 further comprises a laser-heating system 27 including a laser source 28 and a re-direction optics 30.

Laser source 28 may comprise any type of laser, continuous wave or pulsed, and may operate at any wavelength. In one embodiment of the instant invention, laser source is a continuous wave (CW) $CO_2$ laser or any suitable continuous wave laser including but not limited to visible and near infrared lasers such as ND:YAG lasers or the like. In accordance with one embodiment of the instant invention, laser source 28 comprises an unfocused laser. In accordance with another embodiment of the instant invention, laser source 28 is selected based on which wavelength has the highest adsorptivity by workpiece 20.

Re-direction optics system 30 typically comprise a mirror, a lens, a prism or the like.

In one embodiment, laser source 28 produces a laser beam 32 having an annular profile. The annular laser beam 32 is redirected by re-direction optics system 30 such that annular laser beam 32 irradiates targeted workpiece 20. Annular laser beams 32 typically exhibits an internal diameter in the range between about 10 mm to about 80 mm and an external diameter in the range between about 15 mm to about 100 mm.

During operation, laser-heating system 27 is manipulated such that the profile of annular laser beam 32 approximately matches the cross-section of annular overspray region 26. Accordingly laser beam 32 irradiates overspray region 26, heating the overspray material and the overspray region of targeted workpiece 20. Laser heating system 27 may be manipulated in order to vary the diameter size of annular laser beam 32 in a variety of fashions, including but not limited to, varying the power input to laser source 28 or by varying the distance between laser-heating system 27 and targeted workpiece 20.

Accordingly, as the portion of molten particle envelope 22 spreads beyond the outer extent of heating plume 18, laser heating system 27 heats that portion of molten particle envelope 22 and the impinging spray material in overspray region 26. The heating provided by laser beam 32 supplements the heat provided from primary energy source such that incompletely melted spray particles from molten particle envelope 22 spreading beyond the outer extent of heating plume 18 are heated and melted by laser heating system 27.

Figure 2:
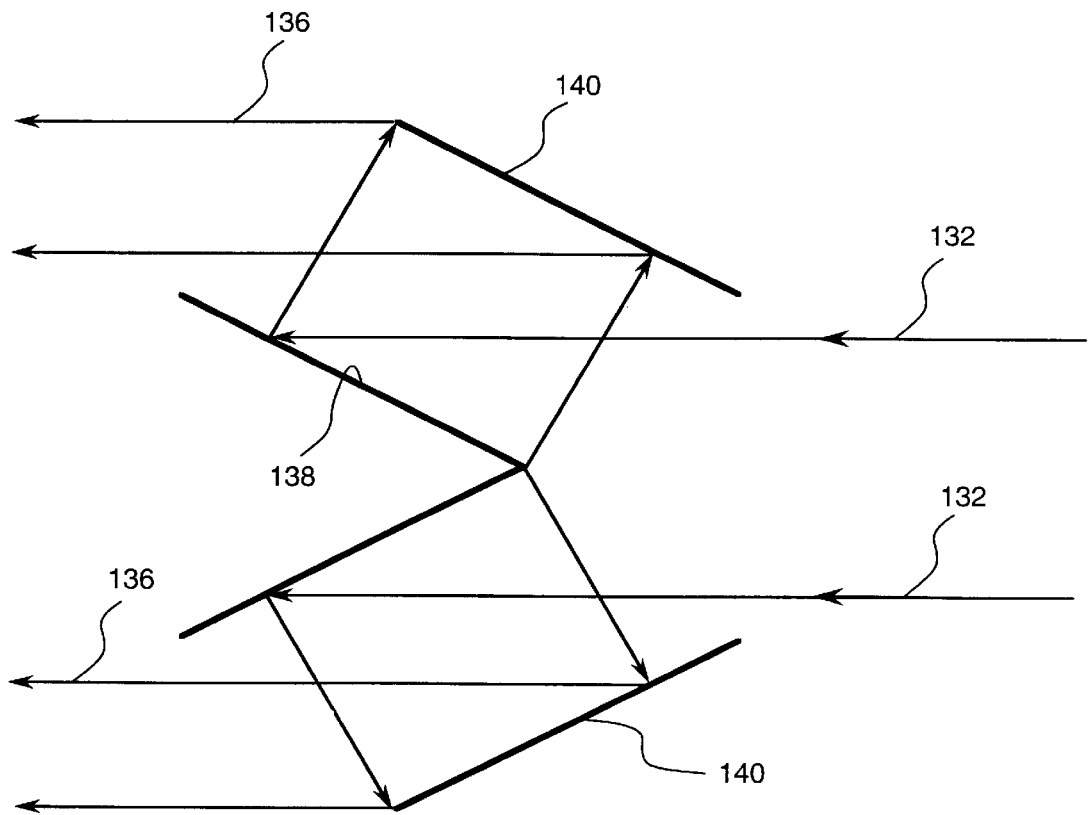
FIG. 2 is a schematic representation of a beam shaping component in accordance with one embodiment of the instant invention.

In an alternative embodiment, laser source 28 produces a laser beam 132 that has a circular beam intensity profile, as shown in FIG. 2. Accordingly, system 10 further comprises a beam shaping component 134 that receives laser beam 132 and shapes beam 132 so as to form a laser beam 136 with an annular beam profile. In one embodiment, beam shaping component 134 comprises a cone-shaped mirror 138, and an annular mirror 140. The mirror surfaces of the two components 138 and 140 are essentially parallel with respect to one another, so that circular beam 132 and resulting annular beam 136 propagate in the same direction.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A laser assisted thermal spraying system for material spraying of a workpiece, said system comprising:

a primary energy source;

a spray material injector for injecting a spray material comprising a plurality of particles into said primary energy source;

a propelling means for introducing a flow of fuel gas within said primary energy source to establish a heating plume so as to propel said spray material in a molten envelope toward said workpiece; and a laser heating system producing a laser beam with an annular profile to be manipulated such that said annular profile of said laser beam approximately matches an overspray region;

wherein said laser heating system is disposed to irradiate said overspray portion of said spray material such that said spray material within said overspray region is molten when deposited upon said workpiece so as to limit incompletely melted particles thereon.

2. A laser assisted thermal spraying system, in accordance with claim 1, wherein said spray material is a material selected from the group consisting of metallic-materials, non-metallic materials, non-metallic-metallic mixed materials, ceramic-ceramic composite materials, ceramic-metal composite materials and metal-matrix composite materials.

3. A laser assisted thermal spraying system, in accordance with claim 1, wherein said spray material comprises a metal.

4. A laser assisted thermal spraying system, in accordance with claim 1, wherein said spray material comprises a ceramic.

5. A laser assisted thermal spraying system, in accordance with claim 1, wherein said spray material comprises diamond.

6. A laser assisted thermal spraying system, in accordance with claim 1, wherein said workpiece is a metal substrate.

7. A laser assisted thermal spraying system, in accordance with claim 1, wherein said workpiece is a mandrel.

8. A laser assisted thermal spraying system, in accordance with claim 1, wherein said workpiece is a mold cavity.

9. A laser assisted thermal spraying system, in accordance with claim 1, wherein said workpiece surface comprises two regions, a core region and said overspray region.

10. A laser assisted thermal spraying system, in accordance with claim 9, wherein said core region is the region of said workpiece in which the spray material propelled at said workpiece is completely contained within the extent of said heating plume.

11. A laser assisted thermal spraying system, in accordance with claim 10, wherein said core region is substantially fully melted.

12. A laser assisted thermal spraying system, in accordance with claim 11, wherein substantially fully melted is the state of said spray material in which said material contains less than about 1 percent by volume of incompletely melted particles.

13. A laser assisted thermal spraying system, in accordance with claim 9, wherein said overspray region is the region of said workpiece in which the spray material propelled at said workpiece spreads beyond the outer extent of said heating plume.

14. A laser assisted thermal spraying system, in accordance with claim 1, wherein said laser-heating system comprises a laser source and a redirection optics.

15. A laser assisted thermal spraying system, in accordance with claim 14, wherein said laser source is a continuous wave laser.

16. A laser assisted thermal spraying system, in accordance with claim 14, wherein said laser source is a continuous wave $CO_2$ laser.

17. A laser assisted thermal spraying system, in accordance with claim 14, wherein said laser source comprises an unfocused laser.

18. A laser assisted thermal spraying system, in accordance with claim 14, wherein said laser source produces a wavelength that has a high adsorptivity level by said workpiece.

19. A laser assisted thermal spraying system, in accordance with claim 14, wherein said laser heating system is manipulated by adjusting the power of said laser source.

20. A laser assisted thermal spraying system, in accordance with claim 14, wherein said re-direction optics redirects said annular laser beam such that said annular laser beam irradiates said targeted workpiece.

21. A laser assisted thermal spraying system, in accordance with claim 1, wherein said laser beam having an annular profile comprises an internal diameter in the range between about 10 mm to about 80 mm and an outer diameter in the range between about 15 mm to about 100 mm.

22. A laser assisted thermal spraying system, in accordance with claim 1, wherein said laser heating system is manipulated by varying the distance between said laser heating system and said targeted workpiece.

23. A laser assisted thermal spraying system, in accordance with claim 1 wherein said laser heating system produces a laser beam that has a circular beam intensity profile.

24. A laser assisted thermal spraying system, and accordance with claim 22, further comprising a beam shaping component that receives said circular beam and shapes said beam so as to form a laser beam with an annular beam profile.

25. A method of laser assisted thermal spraying comprising the steps of:
   generating a heating plume;
   directing said heating plume to impinge on a target workpiece;
   injecting a spray material comprising a plurality of particles into said heating plume so as to propel said spray material in a molten envelope toward said workpiece;
   irradiating an overspray region of said workpiece so as to supplement the heat provided by said heating plume with a laser heating system having a laser beam to fully melt any incompletely melted particles that are spread beyond the outer extent of said heating plume.

26. A method of laser assisted thermal spraying, in accordance with claim 25, wherein said workpiece comprises two regions, a core region and said overspray region.

27. A method of laser assisted thermal spraying, in accordance with claim 26, wherein said laser heating system is manipulated such that a profile of said laser beam approximately matches the cross-section of said overspray region.

* * * * *